(12) United States Patent
Balogh

(10) Patent No.: US 7,084,841 B2
(45) Date of Patent: Aug. 1, 2006

(54) METHOD AND APPARATUS FOR THE PRESENTATION OF THREE-DIMENSIONAL IMAGES

(76) Inventor: Tibor Balogh, Ady Endre üt 3a., H-1192, Budapest (HU)

( * ) Notice: Subject to any disclaimer, the term of this patent is extended or adjusted under 35 U.S.C. 154(b) by 631 days.

(21) Appl. No.: 10/257,019

(22) PCT Filed: Apr. 3, 2001

(86) PCT No.: PCT/HU01/00037

§ 371 (c)(1),
(2), (4) Date: Oct. 7, 2002

(87) PCT Pub. No.: WO01/78409

PCT Pub. Date: Oct. 18, 2001

(65) Prior Publication Data

US 2003/0058209 A1 Mar. 27, 2003

(30) Foreign Application Priority Data

Apr. 7, 2000 (HU) .................................. 0001449

(51) Int. Cl.
*G09G 3/36* (2006.01)
(52) U.S. Cl. .................... 345/87; 345/419; 348/43; 359/23
(58) Field of Classification Search ................ 345/5–8, 345/419; 349/15, 77; 359/462, 23, 24; 348/42–60
See application file for complete search history.

(56) References Cited

U.S. PATENT DOCUMENTS

| | | | |
|---|---|---|---|
| 5,132,839 A | 7/1992 | Travis | |
| 5,801,761 A | 9/1998 | Tibor | |
| 5,822,117 A * | 10/1998 | Kleinberger et al. | 359/465 |
| 5,897,184 A * | 4/1999 | Eichenlaub et al. | 349/64 |
| 6,040,807 A | 3/2000 | Hamagishi et al. | |
| 6,055,013 A * | 4/2000 | Woodgate et al. | 348/59 |
| 6,108,029 A * | 8/2000 | Lo | 348/43 |
| 6,157,474 A * | 12/2000 | Orr et al. | 359/23 |
| 6,201,565 B1 * | 3/2001 | Balogh | 348/40 |

(Continued)

FOREIGN PATENT DOCUMENTS

JP 6-205446 7/1994

(Continued)

OTHER PUBLICATIONS

Eichenlaub J. et al.; "A prototype flat panel hologram-like display that produces multiple perspective views at full resolution" XP-001010742, Jul. 2, 1995.

(Continued)

*Primary Examiner*—Amare Mengistu
(74) *Attorney, Agent, or Firm*—Brooke Kushman P.C.

(57) ABSTRACT

There is disclosed a method and apparatus for the presentation of three-dimensional images, where light beams with appropriate intensity and optionally with appropriate color are projected in different viewing directions and thereby creating a three-dimensional image. The light beams are created with a light emitting surface (10) comprising cyclically addressable light sources (S). The surface (10) is positioned behind a screen (20) comprising pixels (P) with a controllable light transmission or reflection. The light beams emitted from different light sources (S) illuminate the individual pixels (P) from different directions. According to the invention, the distance between the light sources (S) is larger than the distance between the pixels (P), and the light sources (S) are positioned so much away from the pixels so that the number of pixels (P) illuminated by one light source (S) is greater than the number of light sources illuminating one pixel (P).

29 Claims, 9 Drawing Sheets

U.S. PATENT DOCUMENTS

| | | | |
|---|---|---|---|
| 6,603,442 B1* | 8/2003 | Hong | 345/7 |
| 6,736,512 B1* | 5/2004 | Balogh | 353/7 |
| 2001/0028356 A1 | 10/2001 | Balogh | |
| 2003/0156077 A1 | 8/2003 | Balogh | |

FOREIGN PATENT DOCUMENTS

| | | |
|---|---|---|
| JP | 11-72744 | 3/1999 |
| JP | 11-85085 | 3/1999 |
| JP | 11-174376 | 7/1999 |
| JP | 11-308642 | 11/1999 |

OTHER PUBLICATIONS

Eichenlaub J.: "27.2: A Lightweight compact 2-D/3-D Autostereoscopic LCT Backlight for Games, Monitor, and Notebook Applications" XP-000722739, May 13, 1997.

Eichenlaub J. et al. "An in cockpit situation awareness autostereoscopic avionics display" XP-002079529, Jul. 4, 1994.

* cited by examiner

METHOD AND APPARATUS FOR THE PRESENTATION OF THREE-DIMENSIONAL IMAGES

TECHNICAL FIELD

The invention relates to a method and apparatus for the presentation of three-dimensional images, particularly for moving (video) images. The invention is applicable in all areas of image displaying.

BACKGROUND ART

If a plane—two-dimensional—image is displayed on a surface, then every point of the surface emits or reflects light with approximately same intensity (and color) in all directions. This is the working principle of a traditional picture, like a postcard (reflection) or a traditional TV-image (light emission). In the case when a three-dimensional image is presented, the emitted light has a different intensity (and color) in the different directions, even if it is emitted from the same point. We may regard in this way a window pane or a hologram as a display. Hence, in order to display a three-dimensional image, there is needed a light emitting surface where the intensity (and color) of the light emitted from a single image point (pixel) may be controlled as the function of the emission angle (exit angle), with other words, the intensity of the light emitted in the different directions may be controlled.

With some of the known systems suitable for displaying spatial (stereoscopic) images, two images are projected, which may be separated from each other by color filters, polarising filters, or by time-sequentially driven eyeglasses. These effects of the separated images are perceived as three-dimensional, when the two images are sensed by the left and right eye, respectively. These images are not true three-dimensional images, because they only provide the same two perspectives, independent of the position of the viewer in relation to the image. There are other known devices, called autostereoscopic devices, which permit the viewing of stereo images also without aiding means. Such a stereoscopic display is disclosed in EP 0 721 132 and EP 0 729 055, among others.

In order to produce true or realistic three-dimensional images, a large number of light beams must be projected in the different directions in space, with the appropriate intensity/colour, which allow the viewer to see different perspectives from different viewpoints. In some of the prior art displays, two surfaces are used for displaying realistic three-dimensional images. The first front surface is a surface with a controllable light transmission or reflection, and the second back surface is an illuminating surface comprising light sources. One point of the back surface and one point of the front surface defines unequivocally a direction. With a possible embodiment, the image is created on the back surface by controlling the intensity and/or colour of the light sources, while on the first surface only masking is performed according to the selected viewing directions, by switching the image pixels on and off. With an other possible embodiment, the light sources on the back surface are continuously on, or they are only switched on or off, while the controlling according to the image information is made on the first surface. The first surface comprising the image pixels with controllable light transmission or reflection is preferably an LCD display.

Such solutions utilising an LCD display are disclosed, among others, in the documents U.S. Pat. No. 5,831,765, U.S. Pat. No. 5,036,385, WO 99/07161, EP 0 316 465 and U.S. Pat. No. 5,132,839. In these known solutions, illuminated strips are used behind an LCD screen, and the light of the strips are either transmitted or blocked by the controlled image pixels of the LCD screen.

In the solution disclosed in EP 0 316 465, there is an illuminated line behind every pair of LCD-pixel columns, and the light of the line passes through either one column or the other, corresponding to the control of the LCD pixels. This arrangement allows the display of a stereoscopic image with two viewing directions, but the resolution of the LCD-display is low, because two LCD-pixels are needed for an image point. The description suggests increasing the number of LCD-pixels associated to one illuminating line, in order to increase the number of viewing directions, but this leads to a further lowering of the resolution.

With an other possible embodiment, it is suggested to use one illuminating line (light source) behind each LCD-pixel column. In this case every pixel is illuminated by multiple light sources, which results in several viewing directions, having independently controllable light emissions in the same image point. Such a display is described in the publication "A prototype flat panel hologram-like display that produces multiple perspective views at full resolution", by J. Eichenlaub, in: Proceedings of the SPIE Vol. 2409, pp. 102–112. The principle of this known solution is shown in FIG. 1. Here, the number of the light sources is essentially equal to the number of the image pixels in a row. Therefore, in order to produce an image with an acceptable resolution, a large number of very small light sources are needed. These light sources are extremely expensive, due to their small size and the large quantity needed. The light sources may be manufactured by optical methods (e. g. cylindrical lens matrix, disclosed in WO 94/06249), but this requires again a very precise and costly technology, and the illumination angle is also limited. A further disadvantage of this approach is the limited intensity which may be achieved. A similar method is disclosed in U.S. Pat. No. 5,036,385., but only for use as a stereoscopic display, i. e. with only two different views for the left and right eyes for the observer.

U.S. Pat. No. 5,132,839 teaches a solution where an appropriate optical system positioned between the illuminating surface and the LCD screen produces light beams in different directions, but parallel to each other. With this system the LCD-screen is illuminated periodically in different directions, and the LCD-screen is controlled such that the image corresponding to the actually illuminated direction should appear on the on the LCD-screen in the corresponding moment. This solution also requires the use of small light sources, which results in the low intensity, as mentioned above. Also, the optical system (Fresnel lens, lens matrix) for the parallel illumination of the LCD displays makes the device expensive and complicated.

Accordingly, it is an object of the invention to provide a method and apparatus for the presentation of realistic three-dimensional images, preferably for moving images, which allows the display of the images without aiding means and without spatial limitations, and which further do not need expensive focusing and deflecting optical elements.

SUMMARY OF THE INVENTION

According to a first aspect of the invention, there is provided a method for the presentation of three-dimensional images. In the method light beams with appropriate intensity and optionally with appropriate colour are projected in different viewing directions, thereby creating a three-dimensional image.

In the proposed method a light emitting surface comprising separately controllable light sources with angle independent or time-constant angle dependent radiation characteristics is positioned behind a screen, the screen comprising image pixels with a controllable light transmission or reflection. The light beams emitted from different light sources illuminate the individual image pixels from different directions, and further the direction of the light beams emitted from the individual image pixels are determined by the direction of the light beams that are emitted by the light sources and propagating between the light sources and the image pixels substantially without changing direction. According to the method, the distance between the light sources are selected larger than the distance between the image pixels, and the light sources are positioned so much away from the image pixels so that the number of image pixels illuminated by one light source is greater than the number of light sources illuminating one image pixel.

The suggested arrangement results in a number of advantages. Firstly, light sources with a larger size may be used. Secondly, a relatively small number of light sources is necessary.

The angle dependent radiation characteristics is advantageously set to spread light beams into the valid field of view (FOV), in order to maximise brightness and minimise side effects beyond the FOV. The valid field of view is where the viewer can see a true three-dimensional image, defined by the angle between the two farthest pixels illuminated by one light source.

The distance between the light sources is understood as the distance between the centres of the light sources, if the light sources can not be regarded as point-sources. Also, the distance between the image pixels is meant to be the distance between the centres of the image pixels, because the image pixels can normally not be regarded as point objects.

According to an especially preferred realisation of the method, the ratio of the number of image pixels illuminated by one light source to the number of light sources illuminating an image pixel equals the ratio of the distance between the centres of the light sources to the distance between the centres of the image pixels. Thereby fewer and larger light sources are sufficient to produce an image with the same resolution.

In order to see a three-dimensional image with a continuous light intensity and without flickering, according to a further aspect of the invention, it is suggested that the light beams emitted from the individual image pixels are spread in horizontal and vertical directions with a divergence angle necessary for the uniform illumination of a three-dimensional image, where the horizontal divergence angle is at least as large as the angle between two neighbouring viewing directions, and, as practice has shown, it is not more than twice of the angle between two neighbouring viewing directions. In this case the viewer will perceive a continuous image, independent of the angle in which he/she is looking at the screen.

It is also preferred that for a true three-dimensional image both vertically and horizontally the image pixels are illuminated by light sources which are adjacent to each other and have uniform surface illumination, and the size of which is essentially determined by the horizontal and vertical distance between them.

In case the vertical parallax information is omitted, the different horizontal and vertical spread of the lights emitted from the image pixels may be obtained by adjacent vertical light source strips.

With an other preferred embodiment, point-like light sources are used, and the different vertical and horizontal spread (divergence) of the light beams emitted from the individual image pixels are achieved with an appropriate diffuser, e. g. with a holographic of lenticular lens diffuser.

In the most preferred embodiment, the images displayed with the method are obtained by modulating the image pixels on the screen with the image information. In this case it is foreseen that the image pixels and the light sources are controlled in a manner that a, the light sources are switched on and off individually or in groups so that an image pixel is illuminated at one time by not more than one light source, and at the same time each image pixel is illuminated by a light source, b, the light sources are switched on and off periodically or cyclically one after the other so that in each period or cycle each image pixel is illuminated at least once in each viewing direction, and in the meanwhile c, the images projected in the different directions are obtained by the appropriate intensity and/or colour modulation of the light transmitted through or reflected from the image pixels.

In this case, groups are created from the illuminating light sources, where as many neighbouring light sources constitute a group as there are viewing directions. The switching of the light sources are performed in a manner so that at one time only one light source is switched on from each group, preferably the light sources in the similar position within the groups, while those image pixels of the light emitting screen comprising the controllable image pixels, which correspond to a selected viewing direction—in case of a three-dimensional image without vertical parallax information, the columns of pixels—are controlled with the appropriate image information corresponding to the selected viewing direction. After this, the light sources currently on are switched off substantially simultaneously in each group as the light sources in the next position are switched on, and simultaneously the control of the controllable image pixels is changed corresponding to the next viewing direction. It is emphasised that the resolution of the LCD-screen will not decrease, but the controlling frequency will increase proportionally with the number of the viewing directions.

It is suggested that the control of the light sources and the image pixels are repeated periodically, where one period is not longer than $1/20$ s, preferably $1/25$ s. Within one control cycle each light source is activated once, while within one control cycle each image pixel is controlled once in each viewing directions, that is within one control cycle as many times as there are viewing directions. This arrangement ensures that the still and video images will be perceived substantially free of flickering.

However, it is also possible to obtain the three-dimensional images by modulating the light sources with the image information, and using the pixels on the screen only to select the appropriate viewing directions to the modulated light sources. In this case the image pixels are realised as light shutter pixels, and a composed image containing parts of a complete image is generated on the light emitting surface by modulating the light intensity emitted by the light sources. Further, the shutter pixels and the light sources are controlled in a manner that a, a single shutter pixel is illuminated at one time by a group of light sources, each of the light sources in that group corresponding to a viewing direction, and at the same time the light of one light source within that group being transmitted through a single shutter pixel only, b, the shutter pixels and the light sources are modulated so that in each image cycle each shutter pixel is transmitting or reflecting light at least once in each viewing direction, and c, the complete images projected in the different directions are obtained by cyclically transmitting light through the shutter pixels.

According to an other aspect of the invention, there is also suggested an apparatus for the presentation of three-dimensional images, particularly for the performing of the method according to the invention.

The apparatus of the invention comprises a light emitting surface provided with separately controllable light sources with angle independent or time-constant angle dependent radiation characteristics, and a screen comprising image pixels with a controllable light transmission or reflection and positioned before the light emitting surface. In the apparatus the light of the light sources propagates essentially without changing direction between the light sources and the image pixels, and through the image pixels or the light of the light sources is reflected from the image pixels. The light sources and the image pixels are arranged so that each light source illuminates several image pixels, and one image pixel is illuminated by several light sources.

According to the invention, the distance between the centres of the light sources is larger than the distance between the centres of the image pixels, and the distance between the light sources and the image pixels is selected so that more image pixels are illuminated by one light source as there are light sources illuminating a single image pixel.

As indicated above, the distance between the light sources is understood as the distance between the centres of the light sources, if the light sources can not be regarded as point-sources. Also, the distance between the image pixels is meant to be the distance between the centres of the image pixels, because the image pixels can normally not be regarded as point objects.

With the most preferred embodiment of the apparatus according to the invention, the light sources on the back light emitting surface are so far from the image pixels, so that the ratio of the number of pixels illuminated by one light source to the number of the light sources illuminating a single pixel is substantially equal to the ratio of the distance between the light sources to the distance between the image pixels. With this arrangement, the number of the light sources may be reduced substantially, without having to sacrifice the angle resolution of the three-dimensional image.

In a preferred embodiment, the light emitting surface is a LED or OLED (Organic Light Emitting Diode) screen comprising light sources i.e. R,G,B LED-s. Image can be generated by the continuous grey-scale control of the image pixels on the screen or by control of each LED. These may be of different colours. The transmission or reflection of the proper image pixels of the screen, preferably an LCD display, may also be controlled between on and off states only.

If it is desired to display true three-dimensional images that are realistic both vertically and horizontally, then it is suggested that the light sources are formed as light sources with a predetermined vertical and horizontal size in order to provide means for spreading of the light beams emitted from the individual image pixels in vertical and horizontal directions, to ensure the uniform illumination of the three-dimensional image.

If it is sufficient to display images without the vertical parallax information, then the light sources are formed as vertical light source strips positioned adjacent to each, in order to provide different spread of the light beams emitted from the individual image pixels in vertical and horizontal directions.

However, if it is chosen to use light sources which are substantially point sources, than it is suggested that the screen comprising the controllable image pixels comprises a diffuser, like a holographic or lenticular lens matrix in order to provide different spread (divergence) of the light beams emitted from the individual image pixels in vertical and horizontal directions.

It is also feasible that there are multiple light sources at an equal distance below each other behind the diffusing surface. In order to display colour images, it is suggested that the light sources positioned below each other are light sources for the irradiation of basic colours suitable for the presentation of coloured images, and where the basic colours are repeated regularly.

BRIEF DESCRIPTION OF DRAWINGS

The invention will be now described more in detail with reference to the non-limiting embodiments illustrated in the accompanying drawings, where.

BEST MODE FOR CARRYING OUT THE INVENTION

Figure 2:
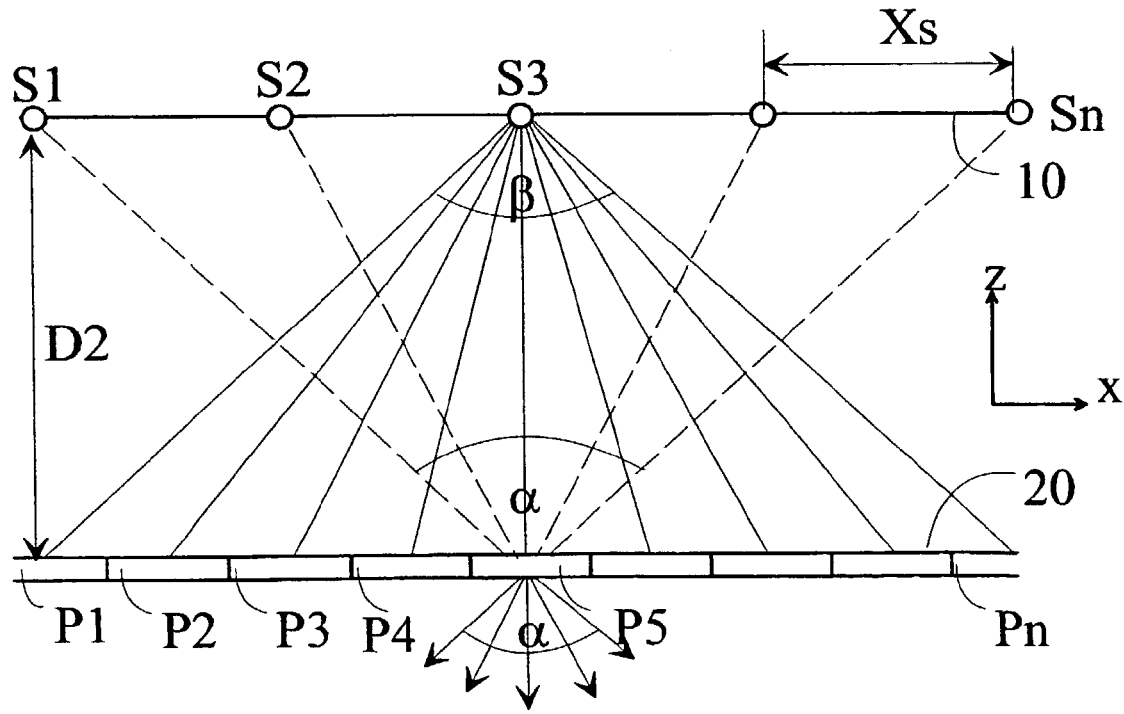
FIG. 2 is a schematic top view of a display arrangement according to the invention.

In the display arrangement shown in FIG. 2, there is provided a screen 20 having controllable light transmission properties, positioned before a light emitting surface 10.

Figure 17:
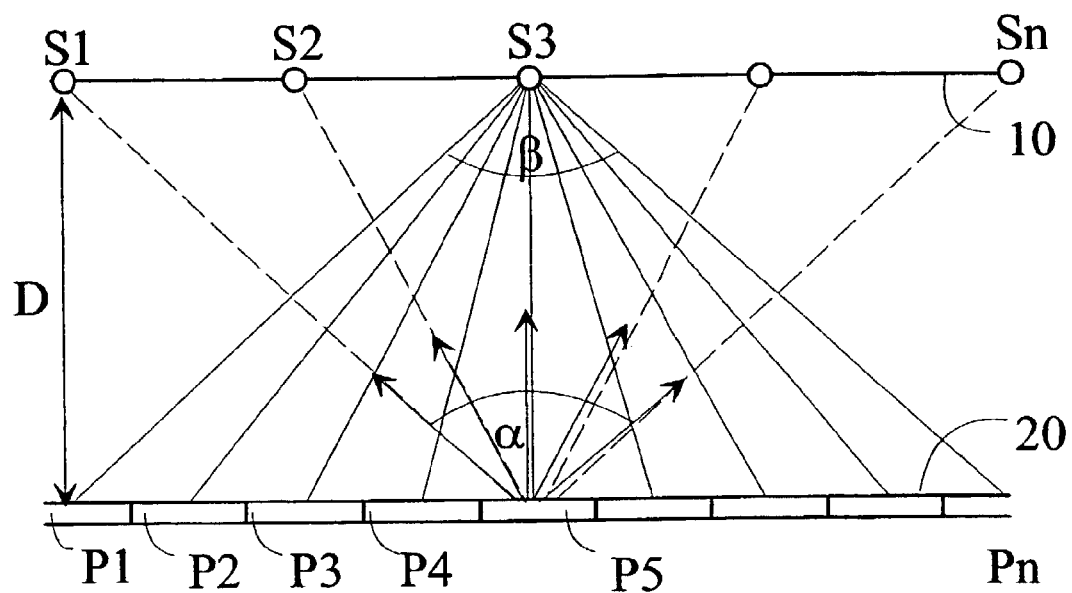
FIG. 17 is a schematic top view of a display arrangement of another embodiment, similar to that shown in FIG. 2, but in reflective configuration.
Figures 18, 22:
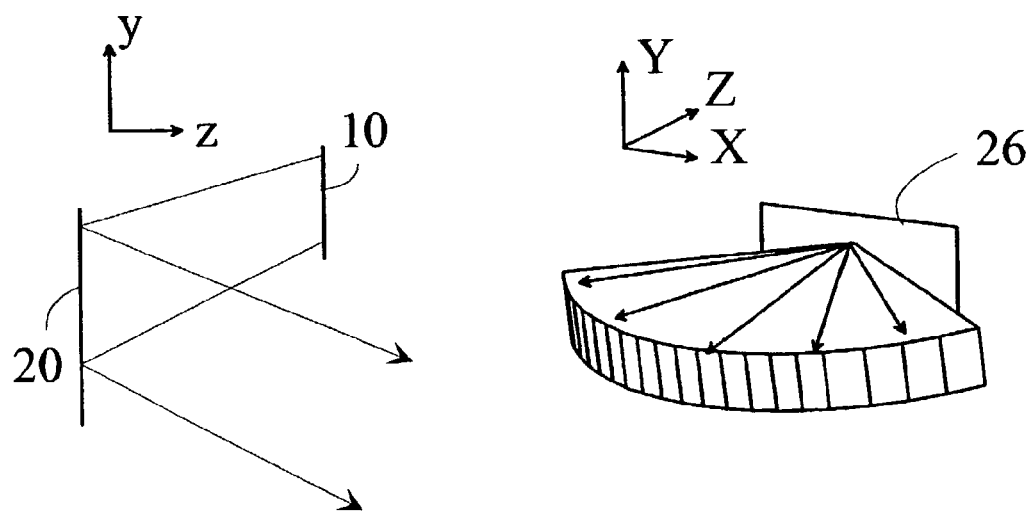
FIG. 18 is a side view of the arrangement shown in FIG. 17.
FIG. 22 is a schematic figure of the radiation characteristic of a LED used in the light emitting surface in the second embodiment of the apparatus.

It will be shown with reference to FIGS. 17 and 18 that the screen 20 may be a screen where the reflection of the pixels may be controlled. For easier illustration and understanding of the inventive concept, the principle will be explained with the help of a transmissive screen 20.

The screen 20 may be embodied by an LCD display, having image pixels P. The centres of the image pixels P are at equal distances Xp to each other. The light emitting surface 10 is at a distance D2 to the screen 20, and there are light sources S1 . . . Sn on the light emitting surface 10, where the light sources S1 . . . Sn are in a distance Xs from each other. The distances Xs are also measured between the centres of the light sources S1 . . . Sn. The light sources may be controlled separately from each other, but, as will be shown below, some of them may be actually controlled (modulated) simultaneously. Theoretically, separate light sources S may be positioned behind every image pixel P, and thus a true or realistic three-dimensional (3D) image may be displayed, which shows 3D effect both vertically and horizontally. However, such an arrangement would require the processing, storage, transfer and display of very large amounts of information, which can not be economically realised at present. Due to the structure of the human eye and the way we perceive 3D images, it is sufficient if the different vertical views are omitted. In this case it is sufficient to realise the light sources as illuminating vertical lines or strips. Because no deflecting optical elements are used between the light emitting surface 10 and the screen 20, the exit angle β of the light sources S is equal to the viewing angle α of the screen 20, that is α=β. The relation between the exit angle β, the viewing angle α, the distance D, the distance Xp and Xs may be described as follows:

$$\tan(\beta/2)=\tan(\alpha/2)=Is \cdot Xp/2D=Ip \cdot Xs/2D,$$

where following denotation is used:

β exit angle (range)

α view angle (range)

Ip the number of the independent viewing directions, also the number of light sources S illuminating one pixel P Is the number of pixels P which are illuminated by one light source S Xp the distance between the centres of neighbouring pixels P Xs the distance between the centres of neighbouring light sources S D the distance between the screen 20 and the light emitting surface 10.

The viewing angle α is defined as the largest angle between the light beams exiting from a pixel P. Good quality 3D images and a large field of view may be achieved with a viewing angle α of 60°. Of course, the viewing angle α may be larger as well.

As an example, selecting α=60°, the distance D between the light emitting surface 10 and the screen 20 may be calculated as D=Is·Xp·tan(60°/2)=Is·Xp·√3. This value of the distance D is defined as the basic distance.

Turning to the value of Is, it is advisable to select the number of the viewing directions in a manner so that the angle γ between two neighbouring viewing directions does not exceed 2°. This angle between the viewing directions (with other words, the angle resolution) is defined as the angle γ between two light beams, which are emitted from the centres of two neighbouring light sources, and are propagating through a common pixel. Seen from the outside, a viewer will perceive that the two light beams exit from the pixel as if they were emitted by a common light source within the pixel, but in different directions. The angle resolution of the display is high, if the value of the angle γ is small, which enhances the 3D perception of the observer. Obviously, selecting a high number of viewing directions within a fixed viewing angle α will result in a small value of the angle γ.

Selecting the values α=60° and γ=2°, the number of the viewing directions will be Ip=60/2=30, which means that each pixel P is illuminated by thirty light sources S, and each light source S illuminates thirty pixels P. This approach is used by the known prior art methods, and it is illustrated schematically in FIG. 1.

The number of the pixels P should be selected to be in the same order of magnitude as with the known displays, i. e. the number of the pixels should be at least 320×240, preferably 640×480, for even better resolution 800×600, or for higher demands 1024×768. Considering a 12″ monitor, with a vertical 320 pixel resolution the distances Xp and Xs will be 0.8 mm, with 640 pixels 0.4 mm, with 800 pixels 0.35 mm, and with 1024 pixels 0.27 mm. If Xp=Xs, it means that the size of the light sources are not larger than the size of the pixels. Light sources in such a minuscule size and in such a large number would mean high costs, and beside, the necessary light intensities are difficult to achieve.

To overcome this problem, it is suggested to select the distance Xs between the light sources S larger than the distance Xp between the image pixels P, and it is also suggested to position the light sources S so much away from the image pixels P, so that the number of image pixels illuminated by one light source S should be greater than the number of light sources S illuminating one image pixel.

Figure 1:
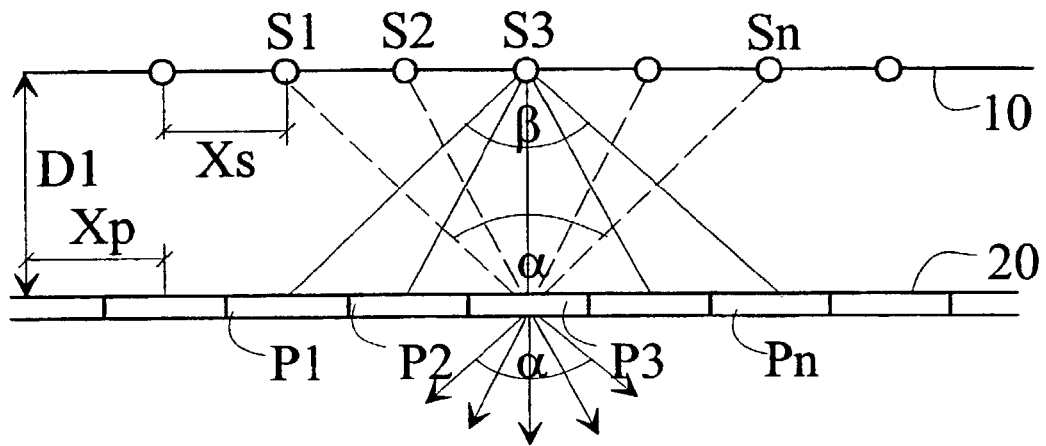
FIG. 1 is a top view of a prior art display arrangement.

As an illustrative example shown in FIG. 2, the light emitting surface 10 is positioned in a distance D2 that is at least twice the basic distance D1, which latter is shown in FIG. 1. The relation α=β will be still valid, because no deflecting elements are applied between the light sources S and the pixels P, but from the relation $$\tan(\beta/2)=\tan(\alpha/2)=Is \cdot Xp/2D=Ip \cdot Xs/2D,$$

it is apparent that the light sources S are twice as far from each other as compared to the arrangement shown in FIG. 1, i. e. Xs=2·Xp. While the number of the viewing directions Ip=30 remains unchanged, the number of the pixels illuminated by one light source will double, that is Is=60. In this way, not only the distance between the light sources doubled, but advantageously the number of the necessary light sources were reduced as well.

As it is apparent from the relation Is·Xp=Ip·Xs, in the proposed display the number of the light sources and the number of the light beams illuminating different pixels is selected such that their product is equal to the product of the number of pixels and the number of light sources emitted from a pixel (i. e. the number of viewing directions). This may be also formulated as follows:

$$Is/Ip = Xs/Xp$$

With other words, the ratio of the number of image pixels illuminated by one light source to the number of light sources illuminating an image pixel equals the ratio of the distance between the centres of the light sources to the distance between the centres of the image pixels.

This measure permits the economic manufacture of displays with a high resolution, because the pixels defining the resolution of the display may be provided in a large number on the first screen, while the number of the viewing directions allowing the 3D effect may be selected appropriately large as well. However, a relatively small number of light sources with larger size, or low resolution displays are sufficient on the second surface, the light emitting surface. It is understood that the number N of the light sources will be $$N = (n \cdot Ip) + Ip,$$

where
N total number of light sources,
n=Dmax/D multiplication factor
Ip the number of viewing directions.

Figure 11:
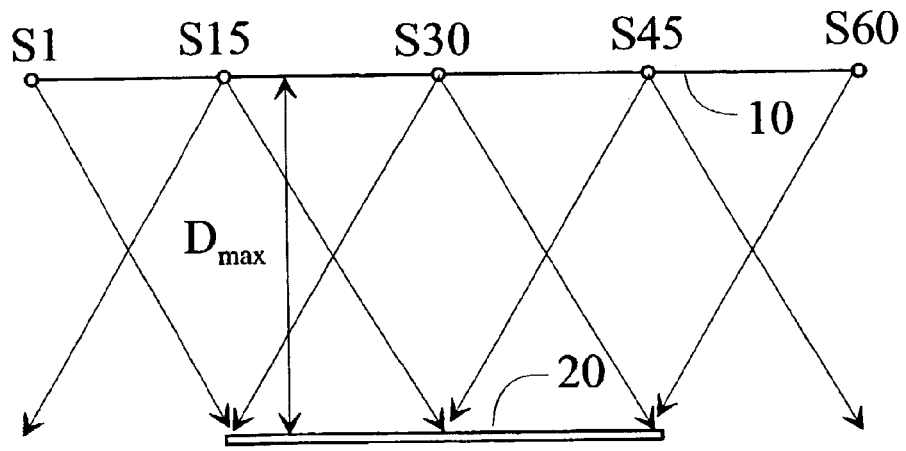
FIG. 11 is a top view of a schematic display arrangement showing the light sources at maximal distance to the screen.

The maximal distance Dmax is defined as the distance where a light source S with an exit angle β will irradiate or illuminate the total width of the screen, or a surface corresponding to the size of the screen. In that case the central light source, here the light source S30, illuminates the screen in an angle β. As it is seen in FIG. 11, in order to have Ip=30 viewing directions from each pixels, it is sufficient to use sixty light sources only, irrespective of the number of pixels P in a horizontal line on the screen 20. That would also imply that the width of the light emitting surface 10 will be twice the width of the screen 20. The distance D between the light emitting surface 10 and the screen 20 will be √3 times the width of the screen 20.

The increase of the depth of the display apparatus and the width of the light emitting surface will not always allow this solution, although this still results in a more flat arrangement than the prior art solutions with an intermediate optical system between the light emitting surface 10 and the screen 20. However, it is more practical to choose the distance D to be smaller. If D is selected to be Dmax/2, only 90 light sources are needed, while Ip remains Ip=30 (see FIG. 12.). If the distance D is halved further, keeping Ip=30 will result in N=150, that is 150 light sources are needed (see FIG. 13). It is apparent from the above that the size of the screen and the number of the light sources may be varied between wide limits by varying the distance D.

Figure 3:
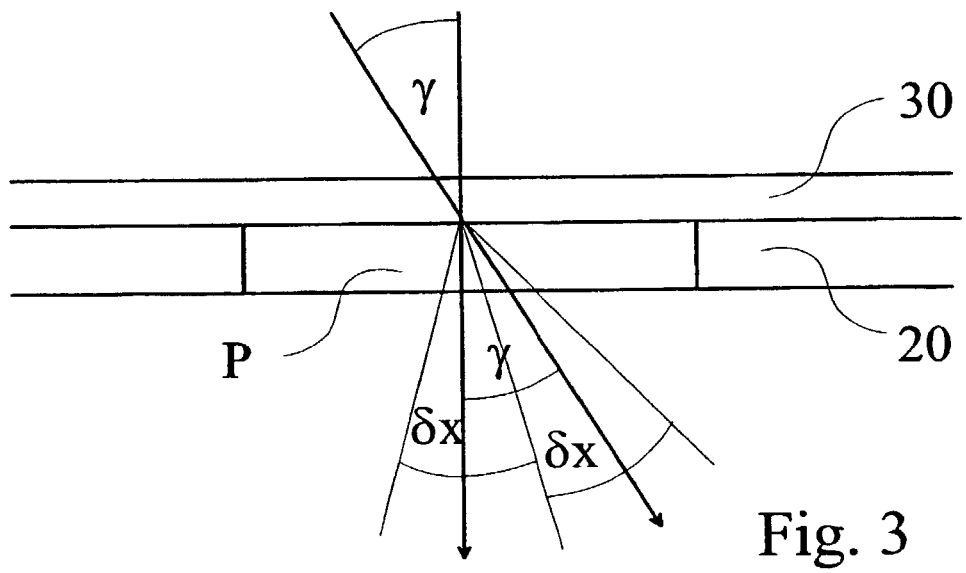
FIG. 3 is a schematic cross-sectional view of a first solution to achieve horizontal spread (divergence) of the light beams, FIG. 4. is a schematic cross-sectional view of a second solution to achieve horizontal spread (divergence) of the light beams.

In order to perceive a continuous image by a viewer, it is necessary that the cones of the light beams passing through the individual pixels (see FIGS. 15 and 16.) should touch or slightly overlap, that is no part of the space within the viewing angle should remain partly or completely dark (not being illuminated by some or all of the pixels). With point-like or line-like light sources, care must be taken to provide some spreading or divergence of the light sources in vertical and horizontal directions. Such an arrangement is shown in FIGS. 3. and 14., where a holographic diffuser 30 is positioned before the screen 20. The diffuser used in the apparatus of the invention is a single diffracting or refractive optical element, or a combination of multiple elements. The spread or divergence angle δx caused by the diffuser in horizontal direction is at least as large as the angle γ between two neighbouring light beams, but not larger than 2·γ, while the spread or divergence angle δy in vertical direction is larger than the horizontal divergence, max. 180°. If the divergence angle δx is substantially greater than the angle γ, e. g. 2·γ, the depth of field will deteriorate substantially, because neighbouring light beams will overlap too much, resulting in a flickering effect in the perceived image.

Figure 4:
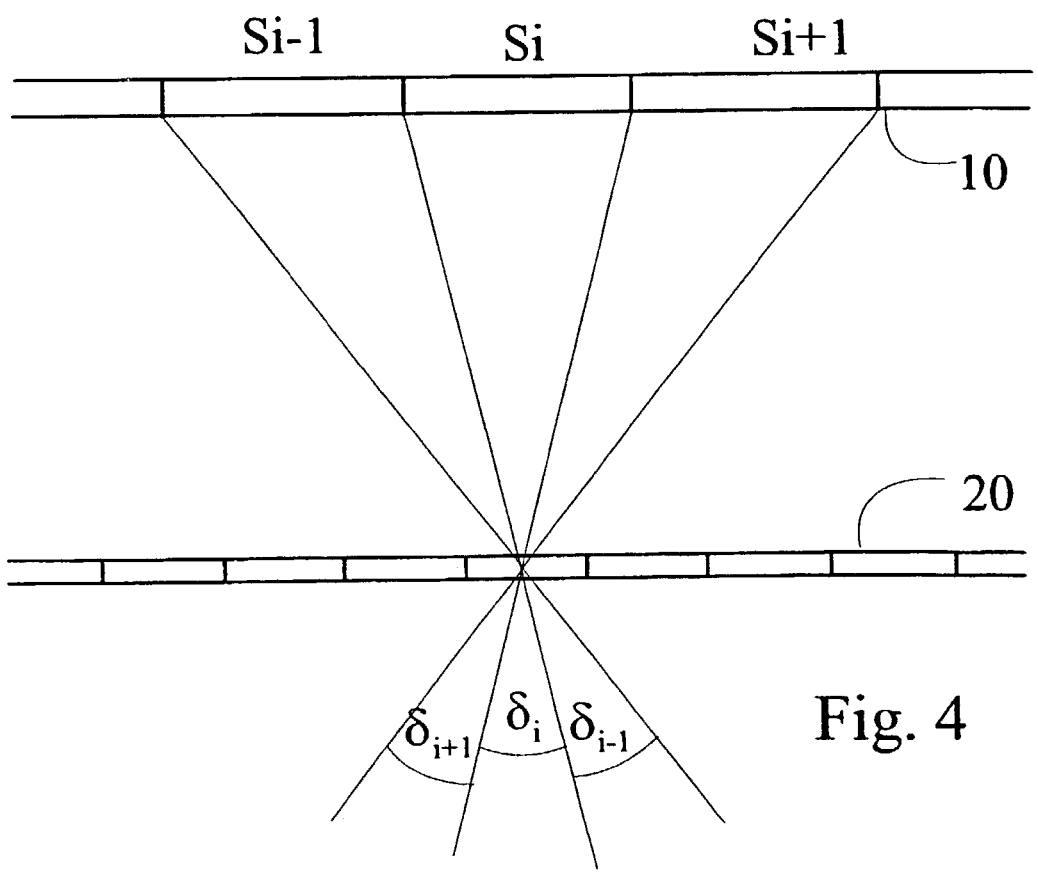

A further embodiment is shown in FIG. 4, where S light sources arranged in vertical and adjacent strips are shown, instead of point-like sources. As seen in FIG. 4., the divergence angles δi−1,δi,δi+1 of the adjacent light sources Si−1, Si, Si+1 are also adjacent, i. e. the viewer will perceive a continuous, uninterrupted image. Only the horizontal divergence angle δx is shown in FIGS. 3 and 4, while in FIG. 14 the horizontal divergence angle δx and the vertical divergence angle δy are shown simultaneously, where δx<<δy<180°.

Several possible embodiments of the light sources schematically shown in FIG. 4 are illustrated in FIGS. 5, 6, 7 and 9. According to FIG. 5, the light emitting surface 10 is made of a ground glass sheet 40 or of a similar material, providing proper diffuse light emission properties into a large exit angle β. Behind the glass sheet 40 there are S light sources positioned equidistantly from each other, and in a definite distance behind the glass sheet 40. The light sources has angle independent or time-constant angle dependent radiation characteristics, i. e. their light intensity may not be modulated differently in different exit angles. With other words, modulation or switching of the light sources will result in the same modulation or switching of the emitted light in all exit directions (exit angles).

Figure 5:
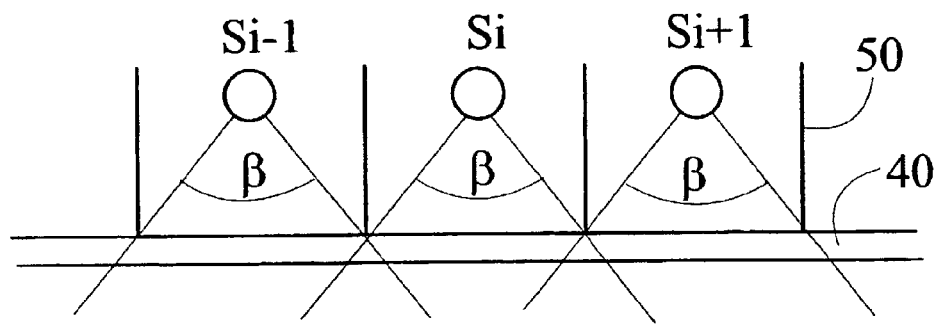
FIG. 5 is a top view of a first embodiment of the illuminating strips used in the apparatus of the invention.

There are separating plates 50 between the light sources, also equidistant from the neighbouring light sources. The position of the separating plates and the light sources define the exit angle β. In the embodiment of FIG. 5 there is no overlap between the light beams entering the glass sheet 40. This may cause non-uniform illumination of the image. Therefore, to compensate this effect, overlapping regions may be created in the glass sheet 40 by retracting the separating plates slightly from the glass sheet 40. This latter arrangement is illustrated in FIG. 6.

Figure 6:
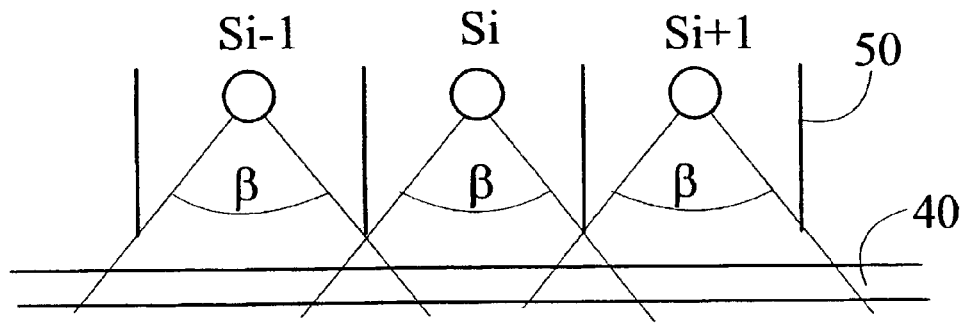
FIG. 6 is a top view of a second embodiment of the illuminating strips used in the apparatus of the invention.
Figure 7:
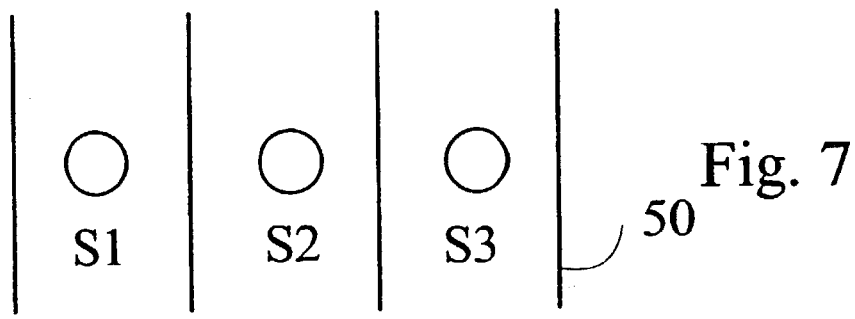
FIG. 7 is a front view of a part of the one-coloured illuminating strips.

While in FIGS. 5 and 6 the light emitting surface 10 is shown from above, FIG. 7 shows a part of the light emitting surface 10 from the front. The structure formed of the separating plates 50 and the light sources S1, S2, S3 is repeated in the same geometry, vertically and horizontally. It is advantageous to repeat the light sources below each other, in order to provide a uniform illumination of the ground glass sheet 40.

Figure 9:
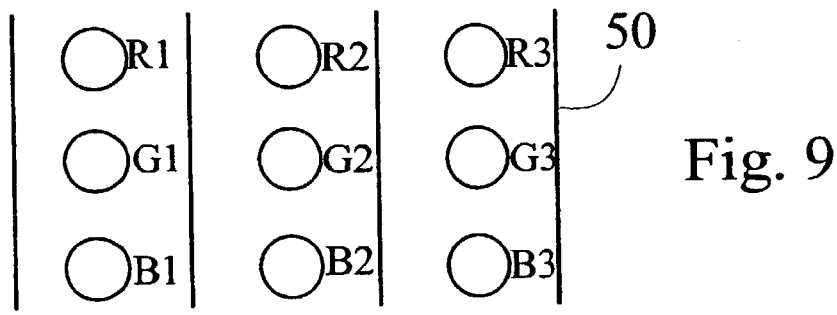

With an other embodiment, the light sources below each other may be differently coloured light sources, radiating in the basic R-G-B colours, and repeated in a regular pattern, typically realised as colour LEDs. Such an arrangement is shown in FIG. 9.

Figure 8:
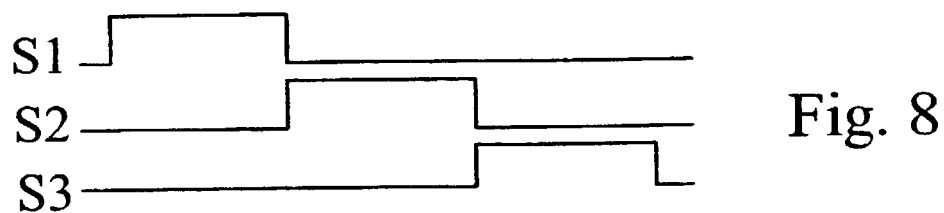
FIG. 8 is a time-diagram of the controlling of the one-coloured strips, FIG. 9. is a front view of a part of the three-coloured illuminating strips.

It is foreseen that groups are created from the light sources, so that neighbouring light sources in a number according to the number of viewing directions constitute one group. The switching on of the light sources are performed so that only one light source within a group is switched on at one time, preferably those light sources that are in the same position in the different groups, while the pixels P of the screen 20 are controlled according to the viewing directions defined by the relevant pixel and the light source currently being switched on, and the image to be shown in each of the defined viewing directions. Thereafter, the light source or the column of the light sources is switched off, and simultaneously in each group, the light source in the next position within the group is switched on. At the same time, the controlling of the pixels also change corresponding to the image in the various viewing directions. With other words, the light sources S are addressed cyclically. The control signals within one addressing cycle for the light sources S1–S3 is schematically illustrated in FIG. 8.

With the arrangement of FIG. 11, where the light emitting surface 10 is at a maximal distance Dmax from the screen 20, the light sources S30 and S60 must be switched simultaneously in order to illuminate the screen 20 completely. Switching S30 and S60 off, the next light sources S1 and S31 are switched on, after that S2 and S32 etc.

Figure 12:
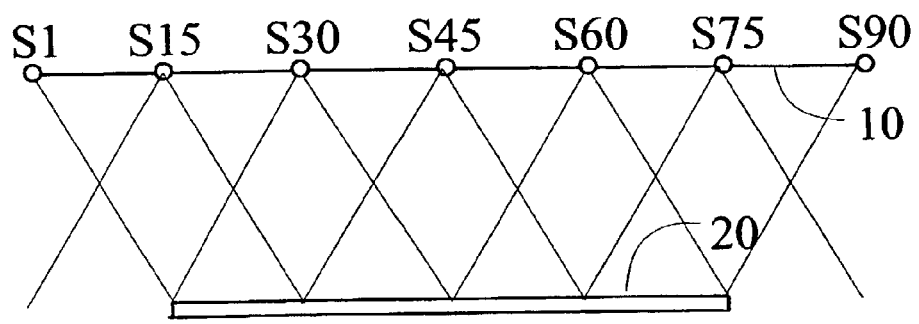
FIG. 12 is a top view of a schematic display arrangement showing the light sources at half of the maximal distance to the screen.

With the arrangement of FIG. 12, where the light emitting surface 10 is in a distance from the screen 20, which is half of the maximal distance Dmax, the light sources S30, S60 and S90 are switched on and off simultaneously. After that, S1, S31, S61 is switched on and off, than S2, S32 and S62, etc.

Figure 13:
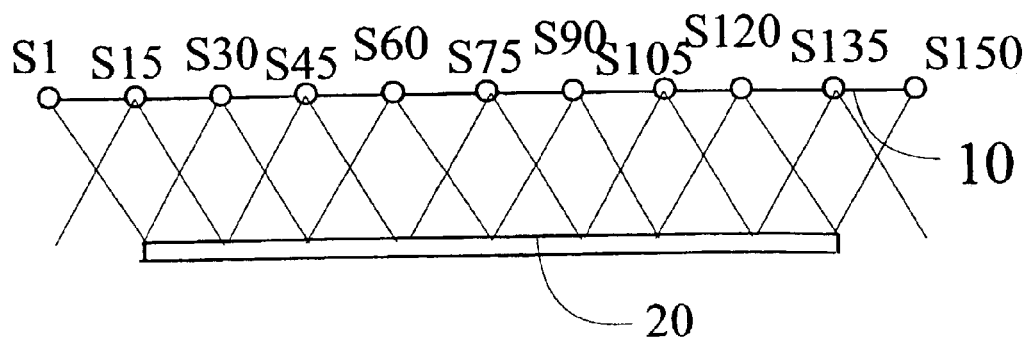
FIG. 13 is a top view of a schematic display arrangement showing the light sources at a quarter of the maximal distance to the screen.

With the arrangement of FIG. 13, where the light emitting surface 10 is in a distance from the screen 20, which is a quarter of the maximal distance Dmax, the light sources S30, S60, S90 and S 120 are switched on and off simultaneously. After that, S1, S31, S61, S91 is switched on and off, than S2, S32, S62 and S92, etc.

The pixels P of the screen 20 are always controlled corresponding to the direction of the exiting light beam and the position of the pixel through which the light beam is emitted. With this solution the resolution of the LCD screen will not decrease, and the controlling frequency increases only proportionally with the number of viewing directions.

Figure 10:
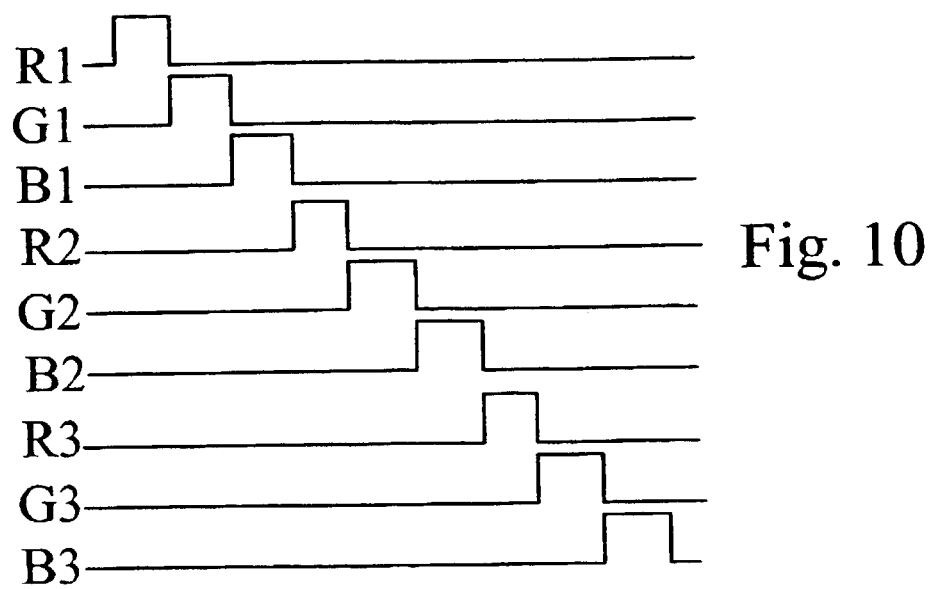
FIG. 10 is a time-diagram of the controlling of the three-coloured strips.

In order to display colour images, several solutions are foreseen. With a first solution, the colour of the light sources is changed periodically according to the three basic colours (time sequential colour control), while the pixels P of the screen 20 are controlled according to the fraction of the relevant colour component in the image point represented by the respective pixel. The cyclic addressing of the colour light sources R1–R3, G1–G3, B1–B3 of FIG. 9 is schematically illustrated in FIG. 10. With a second solution, the colour images are displayed with white light sources and a coloured screen.

The controlling of the light sources S and the pixels P is performed cyclically (periodically), with a frame frequency of at least 20 Hz, preferably at least 25 Hz. During one frame controlling cycle, one image is projected in each viewing directions, so that in one cycle each light source is switched on and off once, while each pixel is controlled once for every viewing direction, that is thirty times within a controlling cycle. Because the light sources are grouped together in numbers corresponding to the number of viewing directions, within a controlling cycle each light source is activated once, so within an image frame cycle the information corresponding to each viewing directions of a still frame is presented. However, it must be noted that the actual image information of a complete real image in any given viewing direction never appears on the screen 20 together. Instead, the different pixels of the screen 20 will show the different parts of a view of a still frame distributed within the image frame cycle. From the above it is apparent that with this arrangement the controlling frequency of the screen 20 is independent of the size of the screen or of any other geometrical relation. This screen controlling frequency (or pixel controlling frequency) is a product of the frame frequency and the number of the viewing directions only. Selecting a 25 Hz frame frequency and Ip=30, the screen controlling frequency of the LCD screen will be 750 Hz. Therewith the screen controlling frequency need not be greater than with the known prior art systems. For this purpose an LCD display developed by Boulder Nonlinear Systems, Inc. may be applied. This LCD display is capable of delivering a 4000 frame/s frequency.

Figure 14:
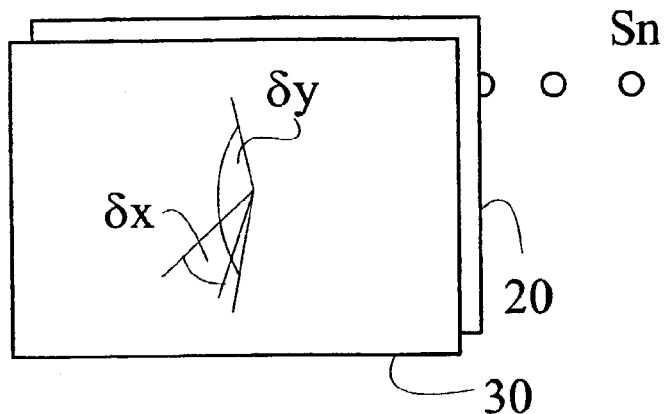
FIG. 14 is a schematic perspective view of a first display arrangement used in the apparatus according to invention.

In FIG. 14, in an arrangement illustrated in a schematic perspective view, the point-like S1 . . . Sn light sources are positioned in a horizontal line behind the screen 20, according to the geometry discussed earlier. Of course, one horizontal line of light sources allow only one vertical view, i. e. the 3D image created lacks the vertical parallax information. If the vertical parallax is omitted, it is advantageous to provide an optical element before the screen 20, which spreads the incident light beams with a smaller horizontal divergence angle δx and with a larger vertical divergence angle δy. This will result in that the emitted light beams will be visible, practically independently of the height of the viewer's eyes, and the visible image will not be confined to a vertically small horizontal region. Therefore, there is a diffuser 30 positioned before the screen 20. The optical deflecting function of this diffuser 30 may be realised with holographic optical elements, or cylindrical optical elements having different vertical and horizontal focus.

Figure 15:
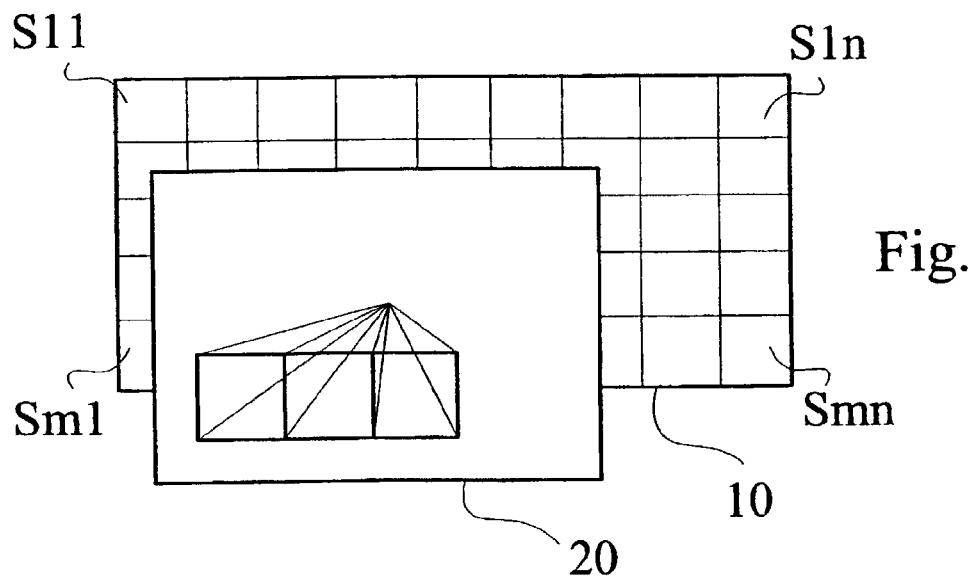
FIG. 15 is a schematic perspective view of a second display arrangement used in the apparatus according to invention.
Figure 16:
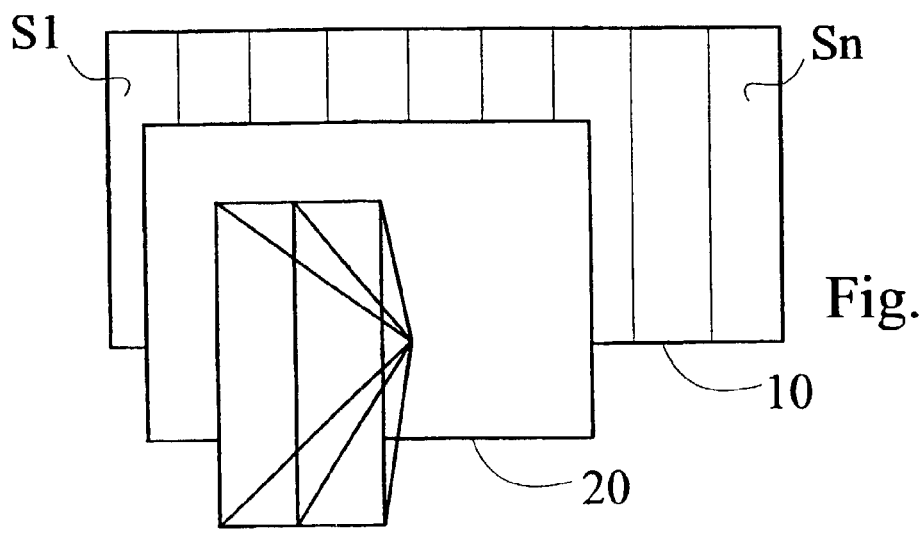
FIG. 16 is a schematic perspective view of a third display arrangement used in the apparatus according to invention.

FIGS. 15 and 16 illustrates the application of extended sources (non-point sources), which ensure the necessary vertical and horizontal divergence angles δx and δy without further deflecting optics.

In the arrangement shown in FIG. 15, the light sources S11, . . . , Smn are realised as uniformly illuminated, adjacent rectangular fields arranged in a matrix, and thereby allow the presentation of 3D images having true perspective views both in vertical and horizontal directions. An other solution is shown in FIG. 16, without vertical parallax, but with a relatively large vertical divergence angle δy. Here the light sources S1 . . . Sn are constituted by vertical, uniformly illuminated adjacent illuminating strips. Such strips may also be substituted with the matrix arrangement of FIG. 15, where the columns of the light sources are controlled in a parallel manner.

It must be emphasised that the screen 20 may be a reflective screen as well. In this case, the light beam emitted from the light sources S1–Sn will be reflected back towards the same side of the screen 20 where the light sources are situated. This arrangement is illustrated with FIGS. 17 and 18. In order to allow the viewers to see the screen 20, the light emitting surface 10 is situated so that the light beams emitted from the light sources S1–Sn will not be perpendicular to the screen 20 in the Y-Z plane, but at an oblique angle. In this manner the observation of the reflected beams will not be obstructed by the light emitting surface 10, and the viewers will be able to watch the screen 20 undisturbed. In this way the screen 20 may be fixed on a wall, while the light emitting surface 10 may be formed as an overhead projector.

Figure 19:
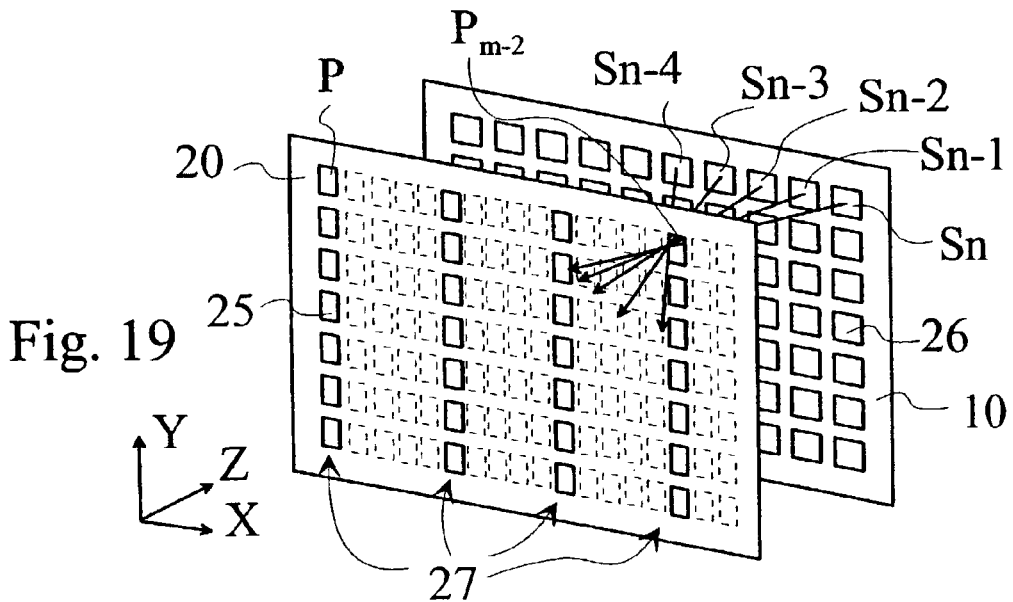
FIG. 19 is a schematic perspective view of another embodiment of the apparatus embodying the inventive concept.

The inventive concept is equally applicable when the projected images, more precisely, the light beams creating the perceived images, are not modulated with the image information on the light emitting screen 20, but on the light emitting surface 10. This is illustrated in FIG. 19, where the basic structure of a further apparatus for the presentation of three-dimensional images is shown. This apparatus also comprises a light emitting surface 10, which is provided with light sources S. As before, the light sources S themselves have angle independent or time-constant angle dependent radiation characteristics. These light sources may be realised as individually addressable LED-s 26, or as an integrated LED display.

In order to avoid crosstalk between the horizontal lines of light sources and shutter pixels in the neighbouring horizontal lines, the radiation characteristic of the LED-s 26 should have little or no vertical divergence, and a relatively large horizontal divergence, as shown in FIG. 22. This ensures that the light sources illuminate only the associated shutter pixels arranged in a horizontal direction, namely those shutter pixels only that are in the same line as the respective light sources. For this purpose, a physical separation may be provided between the neighbouring horizontal lines of the pixels and light sources, in the form of opaque horizontal plates extending between the surface 10 and the screen 20. Alternatively, the radiation characteristic shown in FIG. 22 may be achieved with appropriate beam shaping optical elements (not shown) applied on the LEDs 26.

There is also a screen 20 before the light emitting surface 10, and the screen 20 comprises cyclically addressable shutter pixels 25. The shutter pixels 25 have a controllable light transmission or reflection. The pixels of the screen 20 are here termed as "shutter" pixels because they are either transmitting (or reflecting) the incident light essentially without intensity modulation, or completely block the light. It is also foreseen that the shutter pixels are able to modulate the transmitted light.

In the embodiment shown in FIG. 19, the shutter pixels 25 operate in a transmission mode. The light of the light sources S propagates essentially without changing direction between the light sources S and the shutter pixels 25, and through the shutter pixels 25. However, as shown FIGS. 17 and 18, the screen 20 may operate in a reflection mode as well.

The resolution of the images displayed by the apparatus is determined by the resolution (density) of the shutter pixels, in the sense that the displayed 3D image may have as many image points in a viewing direction as there are shutter pixels on the screen 20. Because as a person viewing the screen 20 can only receive light from the apparatus which is emerging from a shutter pixel 25, hence the resolution of the perceived image is determined by the resolution of the screen 20. At the same time, the angle resolution of the apparatus, which defines the field of depth of the 3D view, is determined by the density of the light sources S. As will be shown below, there is a tradeoff between selecting a high angle resolution and high display operating frequency, or having a lower angle resolution and thereby lowering the display operating frequency as well.

Each light source S illuminates several shutter pixels 25, and one shutter pixel is illuminated by several light sources within a cycle. In FIG. 19 it is seen that the light of the light sources Sn-4–Sn pass through a single shutter pixel $P_{m-2}$, which is in the "on" state, i. e. it is transmissive. The neighbouring shutter pixels in the same horizontal line are in the "off" or blocking state.

A single shutter pixel is illuminated at one time by a group of light sources S, e. g. the pixel Pm-2 in FIG. 19 is illuminated by the light sources Sn-4, Sn-3, . . . Sn. Similarly, in FIG. 21A it is seen that the light of the light sources S3,S4,S5 pass through the single shutter pixel $P_{1+k}$. At the same time, the light of one light source within that group is transmitted through that single shutter pixel only, because the neighbouring shutter pixels are in an off state. The light sources S and the shutter pixels P are modulated so that in each image cycle each shutter pixel is transmitting light at least once in each viewing direction, i. e. a light beam will be emitted from each shutter pixel towards each viewing direction in each image cycle.

A composed image is generated on the light emitting surface 10 by controlling the light sources S. This composed image does not correspond to any real image or real view, i.e. an image that is actually seen by the viewer from any direction. The light sources S creating this composed image are modulated according to those image details associated to an image, which image details should be seen from the different viewing directions at the location of the single open shutter pixel.

As the shutter pixels are turned on and off cyclically, e. g. arranged in columns 27 shown in FIG. 19, the images projected in the different directions are obtained by cyclically transmitting light through the shutter pixels. The horizontal distance between the columns 27 are chosen so that light emitted from any of the light sources S may reach only one single "open" shutter pixel, so that the given light source S may be modulated according to a single viewing direction of the projected image, the viewing direction being determined by the relative position of the light source and the open shutter pixel.

The light sources S of the light emitting surface 10 and the shutter pixels 25 of the screen 20 are controlled by an appropriate a control unit (not shown).

Figure 20:
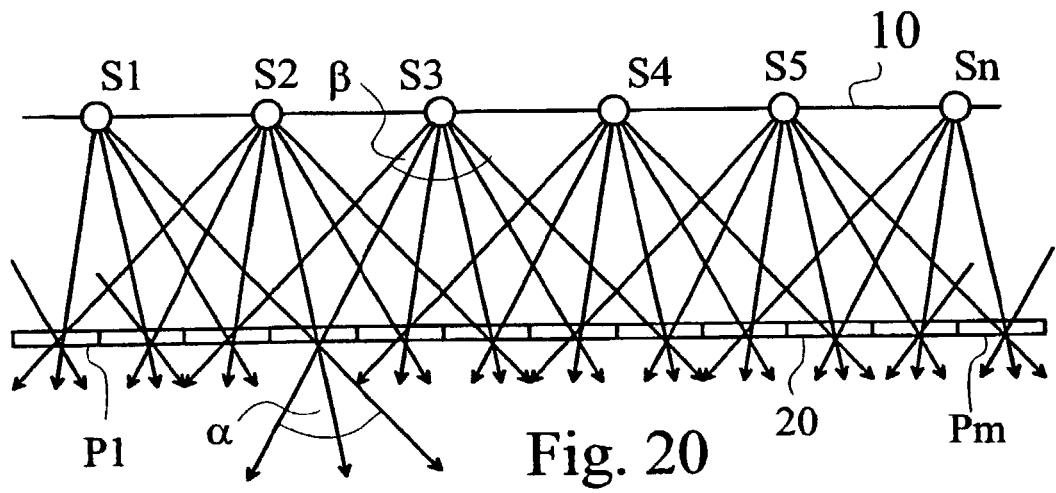
FIG. 20 is a schematic figure illustrating the geometrical arrangement of the light emitting surface and the shutter pixels in the second embodiment of the apparatus.

The principle of the cyclical control of the shutter pixels and the light sources is demonstrated in FIGS. 20 and 21A–21E. As it is seen in FIG. 20, all light sources S1–Sn on the light emitting surface 10 have the same light emitting characteristic, and the light sources are able to emit light in an exit angle β, similarly to the light sources shown in FIG. 2. In FIG. 20, all shutter pixels P1–Pm are in a transmitting (on) state. It is seen that each shutter pixel is illuminated by a certain fixed number of light sources. As explained above, the number of light sources illuminating a shutter pixel is dependent on the distance of the exit angle β, the distance between the light sources, and the distance between the light emitting surface 10 and the screen 20. In the schematic, illustrative arrangement of FIG. 20, each shutter pixel is illuminated by three neighbouring light sources, e.g. the pixels P3 and P4 are illuminated by the light sources S1,S2 and S3. At the same time, a single light source is able to illuminate six neighbouring shutter pixels, e. g. the light source S3 illuminates the pixels P1–P6.

FIGS. 21A–E show that within a viewing cycle, practically within an image frame of approx. $\frac{1}{20}$–$\frac{1}{30}$ s duration, each shutter pixel—being illuminated by three light sources—is turned on. Since one light source illuminates six shutter pixels, but the modulation of a single light source can be done according to a single view seen from a single pixel only, the light sources must be modulated once for each illuminated pixel. This means that the screen 20 must be also modulated with a speed of 6×30 Hz in the shown embodiment, i. e. the image frame is further divided into six time slots or intervals, denoted by t1–t6.

Figure 21A:
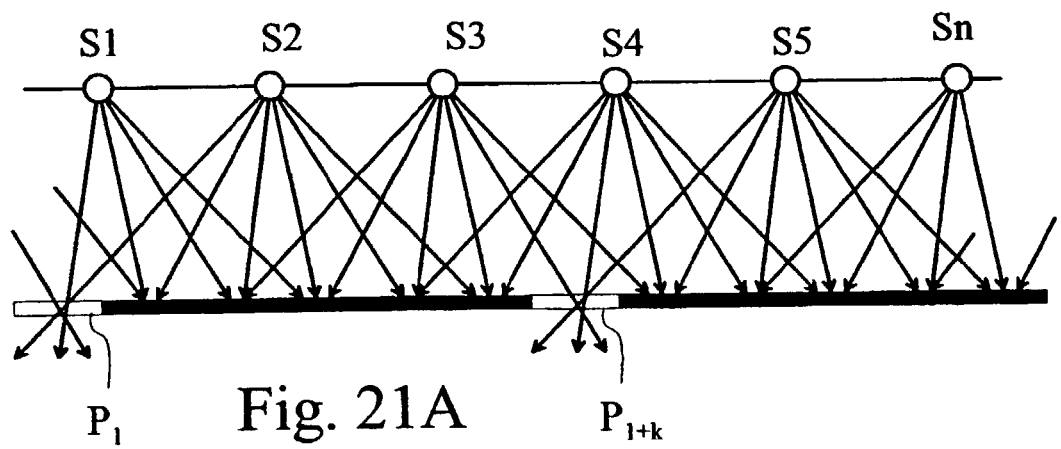
FIGS. 21A–21E illustrate the control cycle of the light sources and the shutter pixels within an image frame.

FIG. 21A illustrates that in the first time slot t1 within one image frame, the pixels $P_1$ and $P_{1+k}$ (and further $P_{1+2k}$, $P_{1+3k}$, . . . etc., these are not shown in FIG. 20) are turned on. The value of k is selected to ensure that the light of a light source is not transmitted through more than one open shutter pixel. Obviously, the value of k is equal to the number of the shutter pixels illuminated by a single light source, i. e. in the shown embodiment k=6. The number of shutter pixels to be switched in a cycle may be also calculated as Ip*Xs/Xp, where Ip is the number of light emitting directions from a shutter pixel. As will be shown below, this number also determines the speed of the shutter pixel screen 20.

Figure 21B:
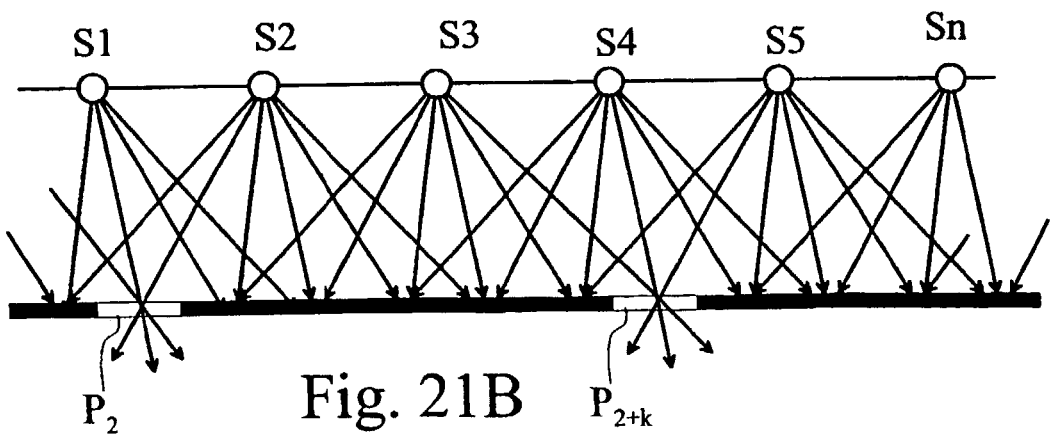
Figure 21C:
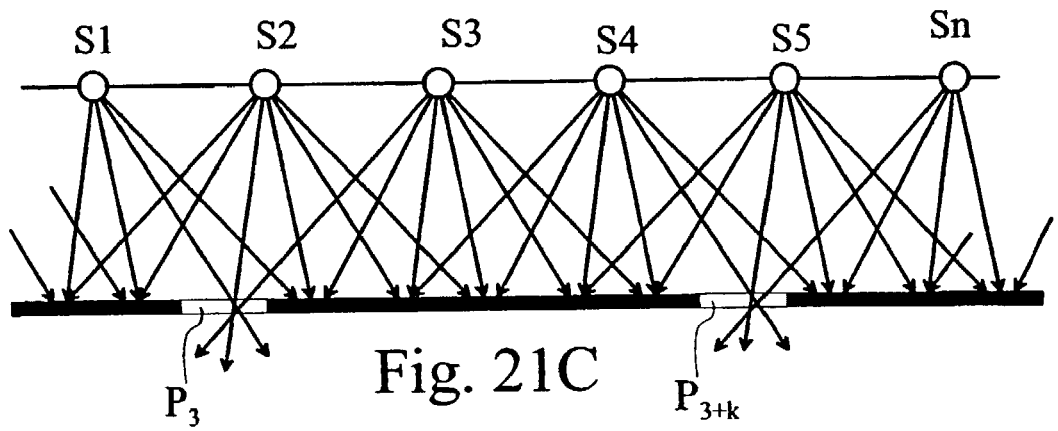
Figure 21D:
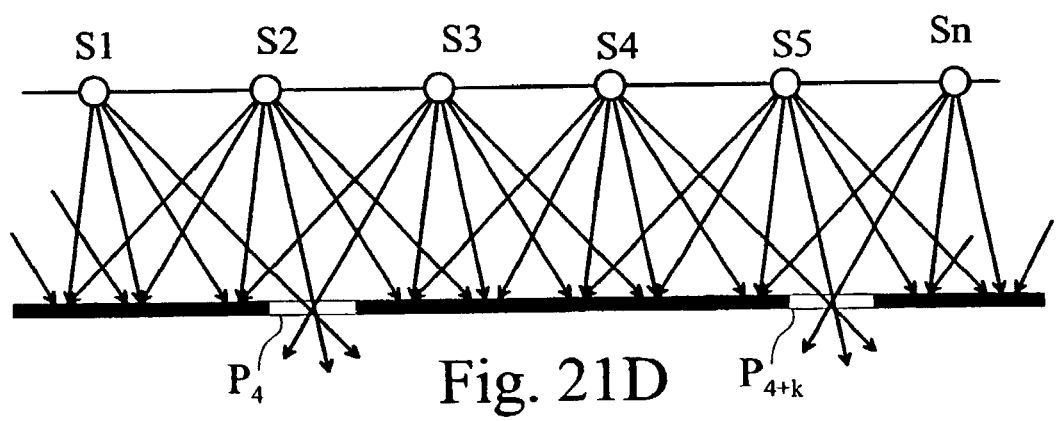
Figure 21E:
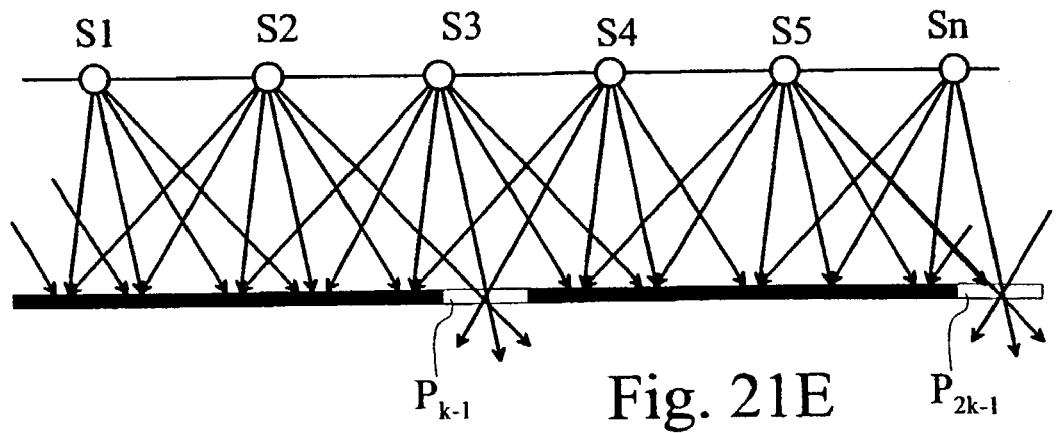

In the next time slot t2, the next shutter pixels $P_2$ and $P_{2+k}$ (and further $P_{2+2k}$, $P_{2+3k}$, . . . etc,) are turned on, as shown in FIG. 21B. Thereafter, in the next time slot t3, the next shutter pixels $P_3$ and $P_{3+k}$ (and further $P_{3+2k}$, $P_{3+3k}$, . . . etc,) are turned on, as shown in FIG. 21C. FIG. 21D illustrate the situation in the time slot t4, and FIG. 21E illustrate the situation in the final time slot t6, within one image frame.

As it may be understood from the figures, within one image frame all shutter pixels are opened once, for the duration of a time slot, being a fraction of an image frame. At the same time, light modulated by different light sources is emitted from different viewing directions from the shutter pixels. Modulating the light according to the appropriate viewing directions, different images may be projected towards the different viewing directions, i. e. three-dimensional images may be obtained. Obviously, this requires that the light sources S are modulated with the same frequency as the shutter pixels. With other words, the light emitting surface must be realised as a fast display, preferably as a LED-display or OLED display.

From FIG. 20 it is apparent that the distance between the centres of the light sources S is larger than the distance between the centres of the shutter pixels P. As explained above, the distance D between the light sources and the shutter pixels is selected so that more shutter pixels are illuminated by one light source within a cycle (one image frame) as there are light sources illuminating a single shutter pixel.

From the above it follows that the distance between the light sources S may be rather large, which may be advantageous with some types of light sources, e. g. if the light emitting surface 10 is constructed from individual LEDs, in order to achieve high brightness. This may be also formulated so that resolution of the light emitting surface 10 can be lower than the resolution of the screen 20. However, this lower resolution must be compensated by the higher operating frequency of both the screen 20 and the light sources of the screen 20. It can be shown that the cycle frequency $f_c$ of both the screen 20 and the surface 10 (i. e. the light sources S) may be calculated as follows: $f_c = f_i \times Ip \times k_1$, where $f_i$ is the frame frequency of the video image to be displayed, typically 20–30 Hz, Ip is the number of different viewing directions obtained with the display, i. e. the number light emitting directions from a single shutter pixel, and $k_i$ is a constant calculated as the ratio between the distances of the light sources and the shutter pixels (Xs/Xp).

With other words, if the resolution of the LED screen 10 is less than the resolution of the screen 20, this must be compensated with higher operating frequency, in order to produce the necessary number of different light beams emerging from the shutter pixels. LED screens with high operating frequency are feasible, while the realisation of the screen 20 may be done with a high-speed LCD display. However, the control of the screen 20 is made advantageously easier, because only on-off modulation is needed, instead of a grey-scale modulation. Therefore, the screen 20 may be realised not only as a screen with a pixel structure, but also as a screen with moving shutter slits.

On the other hand, the light efficiency of the system also decreases, because only 1/k-th part of the light of the light sources is utilised. Therefore, it is generally less efficient to modulate the light sources. Instead, the modulation of the pixels is preferred, as with the embodiment shown with reference to FIGS. 2–18.

The screen 20 is also equipped with a diffractive screen, with a similar function and structure as the holographic diffuser 30 shown in FIGS. 3. and 14 (not shown in FIG. 19). Also, it is foreseen that the features of the advantageous embodiments of the light sources and the image pixels explained with reference to FIGS. 2–18 are equally suitable for the apparatus shown in FIG. 19, where applicable.

The invention claimed is:

1. Method for the presentation of three-dimensional images, where light beams with appropriate intensity and optionally with appropriate colour are projected in different viewing directions, thereby creating a three-dimensional image, wherein:

a, a light emitting surface comprising light sources controllable in control cycles with angle independent or time-constant angle dependent radiation characteristics is positioned behind a screen, the screen comprising image pixels with a controllable light transmission or reflection, where b, the light beams emitted from a predetermined number of different light sources illuminate the individual image pixels from different directions, one image pixel being illuminated in each control cycle at least one by each of the predetermined number of light sources, c, the direction of the light beams emitted from the individual image pixels are determined by the direction of the light beams that are emitted by the light sources and propagating between the light sources and the image pixels substantially without changing direction, and further d, the distance between the centres of neighboring light sources is selected to be larger than the distance between the centres of neighboring image pixels, wherein e, the distance between the centres of neighboring light sources and the distance between the light emitting surface and the screen are selected so that the number of image pixels illuminated by one light source is greater than the predetermined number of light sources illuminating one image pixel.

2. The method according to claim 1, wherein the ratio of the number of image pixels illuminated by one light source to the number of light sources illuminating an image pixel equals the ratio of the distance between the centres of the neighboring light sources to the distance between the centres of the neighboring image pixels.

3. The method according to claim 1, wherein the light beams emitted from the individual image pixels are spread in horizontal and vertical directions with a divergence angle necessary for the uniform illumination of the field of view, from which field of view a three-dimensional image may be perceived.

4. The method according to claim 3, wherein the horizontal divergence angle is at least as large as the angle between two neighboring viewing directions.

5. The method according to claim 3, wherein the image pixels are illuminated by light sources which are adjacent to each other and have uniform surface illumination, and the size of the light sources are determined by the horizontal and vertical distance between them.

6. The method according to claim 3, wherein the light sources are point-like light sources, and the different vertical and horizontal spread (divergence) of the light beams emitted from the individual image pixels is achieved with an appropriate diffuser.

7. The method according to claim 3, wherein images without vertical parallax are displayed, and the different horizontal and vertical spread (divergence) of the light beams emitted from the image pixels are obtained by adjacent vertical light source strips.

8. The method according to claim 1, wherein the image pixels and the light sources are controlled in a manner that a, the light sources are switched on and off individually or in groups so that an image pixel is illuminated at one time by not more than one light source, and at the same time each image pixel is illuminated by a light source, b, the light sources are switched on and off periodically or cyclically one after the other so that in each period or cycle each image pixel is illuminated at least once in each viewing direction, and in the meanwhile c, the images projected in the different directions are obtained by the appropriate intensity and/or colour modulation of the light transmitted through or reflected from the image pixels.

9. The method according to claim 8, wherein groups are created from the illuminating light sources, where as many neighbouring light sources constitute a group as there are viewing directions, and the switching of the light sources are performed in a manner so that at one time only one light source is switched on from each group, preferably the light sources in the similar position, while those image pixels, which correspond to a selected viewing direction, are controlled with the appropriate image information corresponding to the selected viewing direction, and thereafter the light sources currently on are switched off, and substantially simultaneously in each group the light sources in the next position are switched on, and simultaneously the control of the image pixels is changed corresponding to the next viewing direction.

10. The method according to claim 8, wherein for presentation of colour images the colour of the light sources are changed during the switched on state, according to the three basic colours, while the image pixels of the screen comprising the controllable image pixels are controlled according to the colour ratio of the corresponding colour component.

11. The method according to claim 8, wherein for presentation of colour images white light sources and a coloured screen are used.

12. The method according to claim 8, wherein one control period or control cycle is not longer than 1/20 s, preferably 1/25 s, and where within one control cycle each light source is activated once, while within one control cycle each image pixel is controlled once in each viewing direction, within one control cycle as many times as there are viewing directions.

13. The method according to claim 1, wherein the image pixels are realised as light shutter pixels, and a composed image containing parts of a complete image is generated on the light emitting surface by modulating the light intensity emitted by the light sources, and further the shutter pixels and the light sources are controlled in a manner that a, a single shutter pixel is illuminated at one time by a group of light sources, each of the light sources in that group corresponding to a viewing direction, and at the same time the light of one light source within that group is transmitted through a single shutter pixel only, b, the shutter pixels and the light sources are modulated so that in each image cycle each shutter pixel is transmitting or reflecting light at least once in each viewing direction, and c, the complete images projected in the different directions are obtained by cyclically transmitting light through the shutter pixels.

14. Apparatus for the presentation of three-dimensional images, the apparatus comprising:

a, a light emitting surface provided with light sources controllable in control cycles with angle independent or time-constant angle dependent radiation characteristics, and b, a screen comprising image pixels with a controllable light transmission or reflection and positioned before the light emitting surface, where c, the light of the light sources propagates essentially without changing direction between the light sources and the image pixels, and through the image pixels or being reflected from the image pixels, and where each light source illuminates several image pixels, and in each control cycle one image pixel is illuminated at least once by each light source of a predetermined number of different light sources, and d, the distance between the centres of the neighboring light sources is larger than the distance between the centres of the neighboring image pixels, wherein e, the distance between the centres of the neighboring light sources and the distance between the light emitting surface and the screen are selected so that the number of image pixels illuminated by one light source is greater than the predetermined number of light sources illuminating a single image pixel.

15. The apparatus according to claim 14, wherein the light sources on the light emitting surface are so far from the image pixels on the screen that the ratio of the number of pixels illuminated by one light source to the number of the light sources illuminating a single pixel is substantially equal to the ratio of the distance between the centres of the neighboring light sources to the distance between the centres of the neighboring image pixels.

16. The apparatus according to claim 15, further comprising multiple light sources at an equal distance below each other behind the diffusing surface.

17. The apparatus according to claim 14, wherein the screen comprising the controllable image pixels further comprises a diffuser for providing different spread (divergence) of the light beams emitted from the individual image pixels in vertical and horizontal directions.

18. The apparatus according to claim 17, wherein the screen comprises a holographic layer or lenticular lens matrix.

19. The apparatus according to claim 14, wherein the light sources are realised as LEDs, particularly as LEDs of a LED array, LED display or OLED display.

20. The apparatus according to claim 14, wherein the screen comprising the controllable image pixels is constituted by an LCD display or another LCD panel.

21. The apparatus according to claim 14, wherein the light sources are formed as light sources with a predetermined vertical and horizontal size, the size being determined for providing means for spreading of the light beams emitted from the individual image pixels in vertical and horizontal directions.

22. The apparatus according to claim 14, wherein the light sources are formed as vertical light source strips positioned adjacent to each, in order to provide different spread of the light beams emitted from the individual image pixels in vertical and horizontal directions.

23. The apparatus according to claim 14, wherein the light sources are substantially point sources.

24. The apparatus according to claim 14, wherein the light sources are discrete light sources separated by dividing plates, and positioned behind a diffusing surface.

25. The apparatus according to claim 24, wherein the diffusing surface is made of ground glass.

26. The apparatus according to claim 25, wherein the light sources and the dividing plates separating the light sources are at a distance behind the ground glass, in order to ensure space for the overlapping of the light emitted from the light sources.

27. The apparatus according to claim 14, wherein the light sources are positioned below each other and are light sources for the irradiation of basic colours suitable for the presentation of coloured images, and where the basic colours are repeated regularly.

28. The apparatus according to claim 14, wherein the image pixels of the screen are cyclically addressable light shutter pixels, where each light source illuminates several shutter pixels, and one shutter pixel is illuminated by several light sources within a cycle.

29. The apparatus according to claim 28, wherein the light sources have a radiation characteristic for illuminating multiple shutter pixels arranged in a horizontal direction.

* * * * *